United States Patent [19]
Yamamura

[11] Patent Number: 4,632,615
[45] Date of Patent: Dec. 30, 1986

[54] MACHINE TOOLS

[75] Inventor: Motohisa Yamamura, Yamaguchi, Japan

[73] Assignee: Teijin Seiki Company Limited, Osaka, Japan

[21] Appl. No.: 700,235

[22] Filed: Feb. 11, 1985

[30] Foreign Application Priority Data

Feb. 9, 1984 [JP] Japan .................................. 59-22216

[51] Int. Cl.⁴ .......................... B23C 1/00; B23B 39/02
[52] U.S. Cl. .................................... 409/235; 408/234
[58] Field of Search ............... 409/235, 236, 238, 241, 409/191, 185, 190; 408/234, 235; 29/26 A; 51/166 R, 34 C

[56] References Cited

U.S. PATENT DOCUMENTS 1,908,478 5/1933 Eisele ................................ 409/235
1,971,157 8/1934 Johnson ............................. 409/235
3,484,064 12/1969 Koenig, III ..................... 409/238 X

FOREIGN PATENT DOCUMENTS 2902920 8/1979 Fed. Rep. of Germany ..... 29/26 A
991286 5/1965 United Kingdom ................ 408/234

Primary Examiner—William R. Briggs
Attorney, Agent, or Firm—Sughrue, Mion, Zinn, Macpeak, and Seas

[57] ABSTRACT

A machining center in which the moment exerted on a support base and support table during a machining operation is remarkably reduced. The machining apparatus includes a pair of guide rails extending in the longitudinal direction relative to the workpiece upon which the machining head is slidably supported either directly or via a table. The rear one of this pair of guide rails is made higher than the other guide rail, thereby reducing the reaction forces exerted upon the upper surfaces of the guide rails, and hence the moment exerted on the supporting base.

6 Claims, 7 Drawing Figures

MACHINE TOOLS

BACKGROUND OF THE INVENTION

The invention pertains to machine tools such as may be used in a machining center.

An example of a machining center of this type is shown in FIG. 1 of the accompanying drawings. In FIG. 1, reference numeral 1 identifies a bed which acts as a supporting base. On top of the bed 1 are provided a pair of guide rails 3 extending in the longitudinal (X) direction. Slidably mounted on the guide rails 3 is a table 4. The table 4 may be reciprocated in the X direction by a drive mechanism (not shown). A second pair of guide rails 5 are mounted on the table 4, extending in the transverse (Z) direction. A column member 6, slidably mounted on the guide rails 5, is reciprocatable in the transverse direction by a second drive mechanism (not shown). A window 7 is formed in the front surface of the column member 6, and a third pair of guide rails 8 are provided in the window 7, extending vertically. A spindle head 2, slidably supported by the third pair of guide rails, is reciprocatable in the vertical (Y) direction by a third drive mechanism (not shown). A tool 10, for instance, a drill, driven by a motor 9, is removably mounted on the spindle head 2.

A jig bench 11 is provided at the front of the bed 1. A workpiece (not shown) to be machined by the tool 10 is secured by a jig to the jig bench 11. A discharge passage 12 is formed below the jig bench 11 to collect and discharge material such as metal chips produced during a machining operation.

In a machining operation, the tip of the tool 10 is properly positioned relative to the workpiece on the jig bench 11 by moving the table 4 in the X direction, the column member 6 in the Z direction, and the spindle head 2 in the Y direction by the associated drive mechanisms.

During machining, a reaction force F is produced by the pressure of the tool 10 against the workpiece. Especially, if the spindle head 2 is positioned near the upper end of its range, the force F produces a strong moment acting on the guide rails 3.

In the aforementioned machine tools, a force applied to portions where the table 4 is engaging the guide rails 3 is the sum of reaction of weights of the table 4, the column member 6 and reaction of moment derived from the external force. Under the above condition, a great deal of force is created where the distance between of the tool 10 and the guide rails 3 is long. This tends to cause deformation of the table 4, and hence a reduction in the machining accuracy. It is of course possible to alleviate this problem somewhat by making the table 4 thicker. Doing so, however, is accompanied by the further disadvantage that the machine is made heavier and its cost increased.

SUMMARY OF THE INVENTION

Accordingly, it is an object of the present invention to provide machine tools in which the above-discussed problems are eliminated.

More particularly, it is an object of the present invention to provide the machine tools in which machining inaccuracies produced by high moments in the apparatus of FIG. 1 are substantially reduced.

In accordance with the above and other objects, the invention provides the machine tools comprising a supporting base, a pair of parallel guide rails mounted on a surface of the supporting base, a movable block slidably mounted on the guide rails, and a tool supported on the movable block, wherein the one of the guide rails farthest from the tool has a greater height than the other of the guide rails. This pair of guide rails extend in the longitudinal direction relative to a workpiece operated upon by the tool. Preferably, the movably block carrying the tool is mounted on the aforementioned pair of guide rails via a second pair of guide rails and a table, the table being slidably mounted on the second pair of guide rails, and the second pair of guide rails being mounted on the supporting base and extending in the transverse direction relative to the workpiece with the movable block being slidably mounted on the first pair of guide rails.

DESCRIPTION OF THE PREFERRED EMBODIMENTS

Figure 1:
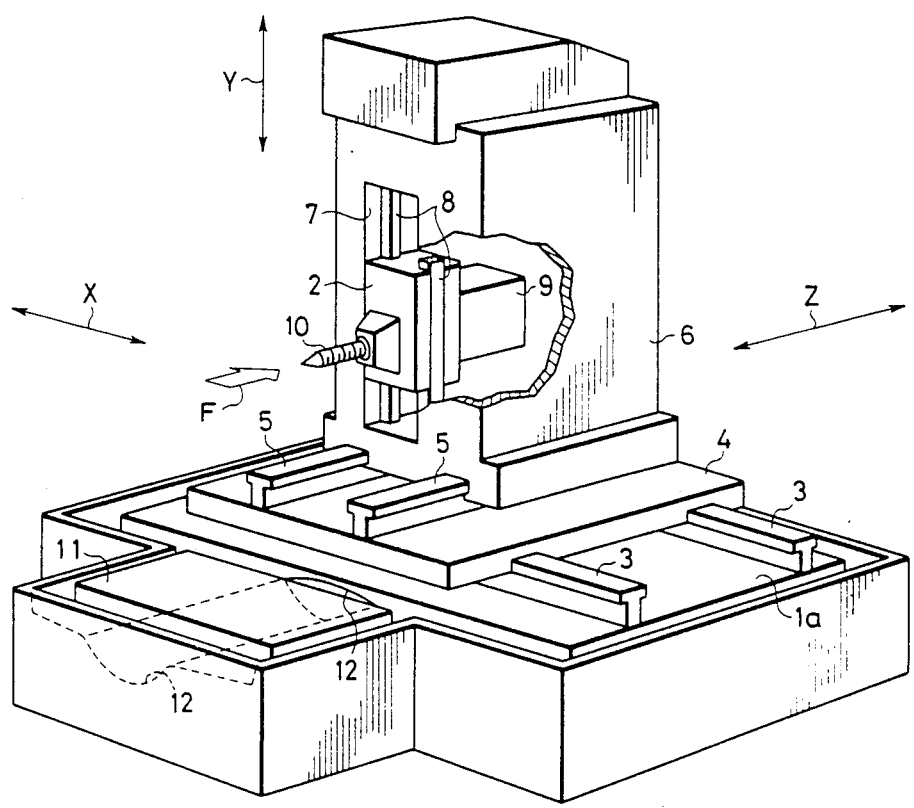
FIG. 1 is a schematic perspective view, with parts cut away, of a conventional machining center.
Figure 2:
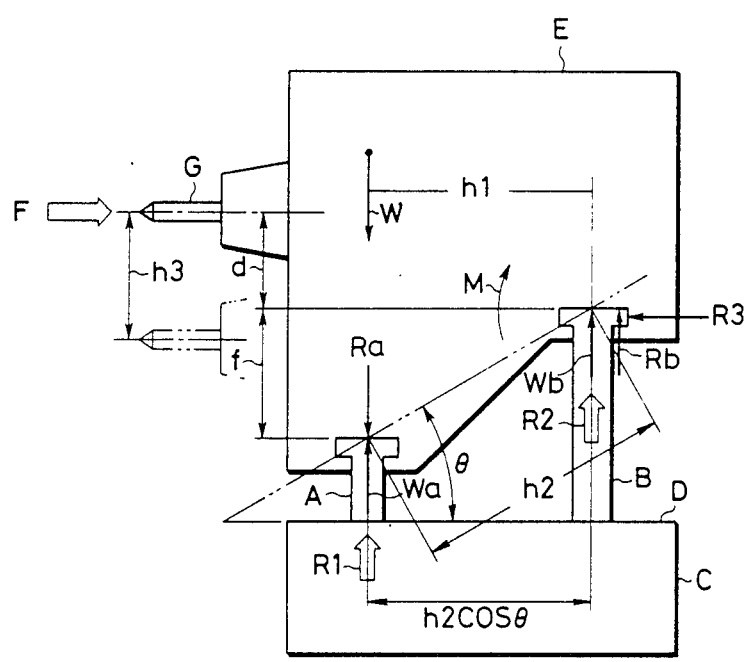
FIG. 2 is a schematic side view used to illustrate the concepts of the present invention.

Referring now to FIG. 2 of the accompanying drawings, the basic concepts of the present invention will be explained.

In a machining operation, a reaction force F acts on a tool G. The reaction force F includes a component vertical to the longitudinal direction of guide rails A and B, which extend parallel to one another and are disposed on a mounting surface D of a supporting base C. This vertical component acts primarily on the rear rail B of the pair of guide rails A and B. In this instance, for the purpose of simplification of explanation, the external force F is considered as having component vertical to the direction of the guide rails A, B as extended and in parallel with the mounting surface D. The movable block E carrying the machine tool G exerts a moment $M = F \times d$ on the supporting base C, where d is the distance between the top of the guide rail B and the level of the tool G. Accordingly, it may be appreciated that, by increasing the height of the guide rail B, the magnitude of the moment M can be reduced, thereby reducing the moment acting on the supporting base C which tends to deform it. In this instance, the guide rail B is higher than the conventional guide rail by a distance f so that the value of the moment M is reduced by the extent to which the guide rail B is made higher. Reactions $R_a$, $R_b$ are adapted to act on the guide rails A, B, respectively by such moment. On the other hand, once weight of the movable block E is defined as W, reactions $W_a$, $W_b$ are generated on the guide rails A, B. Now, the total reactions R2 are less than those in the prior art as the moment M is small, resulting in coping therewith even if rigidity of a support of the guide rail B and the movable block E is insufficient. As aforementioned, the only reactions Wa, Wb act on the guide rails A, B during noloaded condition (when the external force F is not applied) whereas the reactions Ra, Rb derived from the moment M are applied to and act on the reactions Wa, Wb so that the values of the reactions are greatly varied with loading and unloading. In this manner, the values of the reactions are greatly varied so that a spindle coupled to the tool G is considerably deformed to tend to deteriorate machining tolerances. Notwithstanding, the values of the reactions Ra, Rb are less than those in the prior art as above memtioned to thus avoid deterioration of such machining tolerances.

Figure 3:
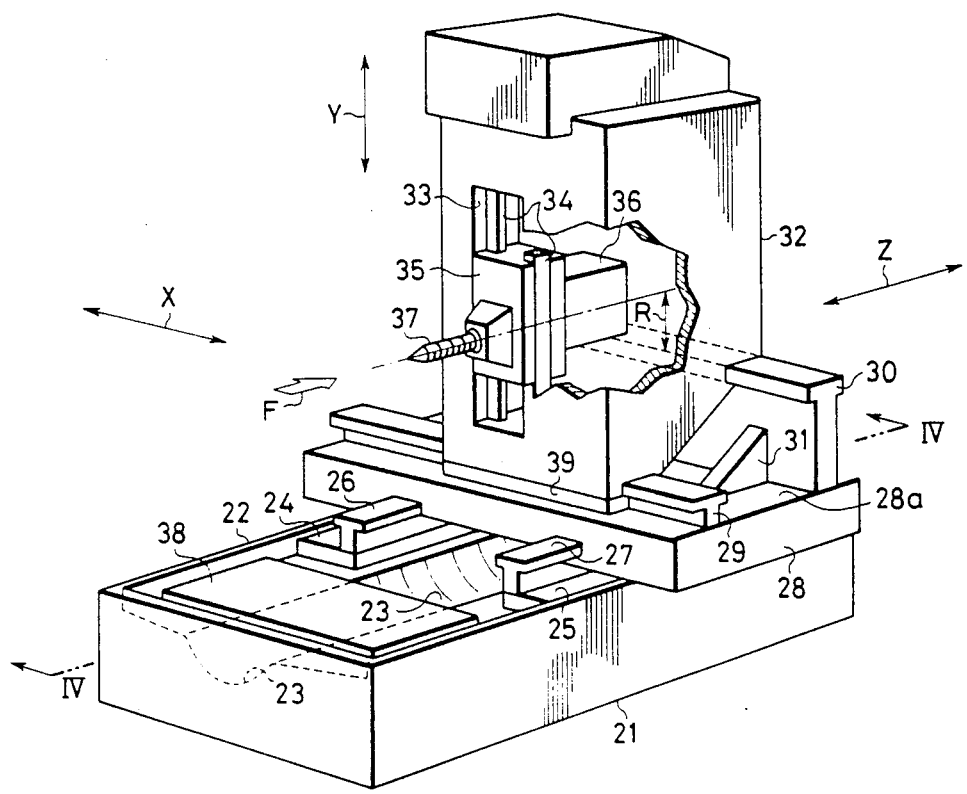
FIG. 3 is a schematic perspective view, with parts cut away, showing a machining center of the invention.

Referring now to FIG. 3, a preferred embodiment of a machining center constructed in accordance with the teachings of the present invention is shown. A side view of this apparatus is shown in FIG. 4.

Figure 4:
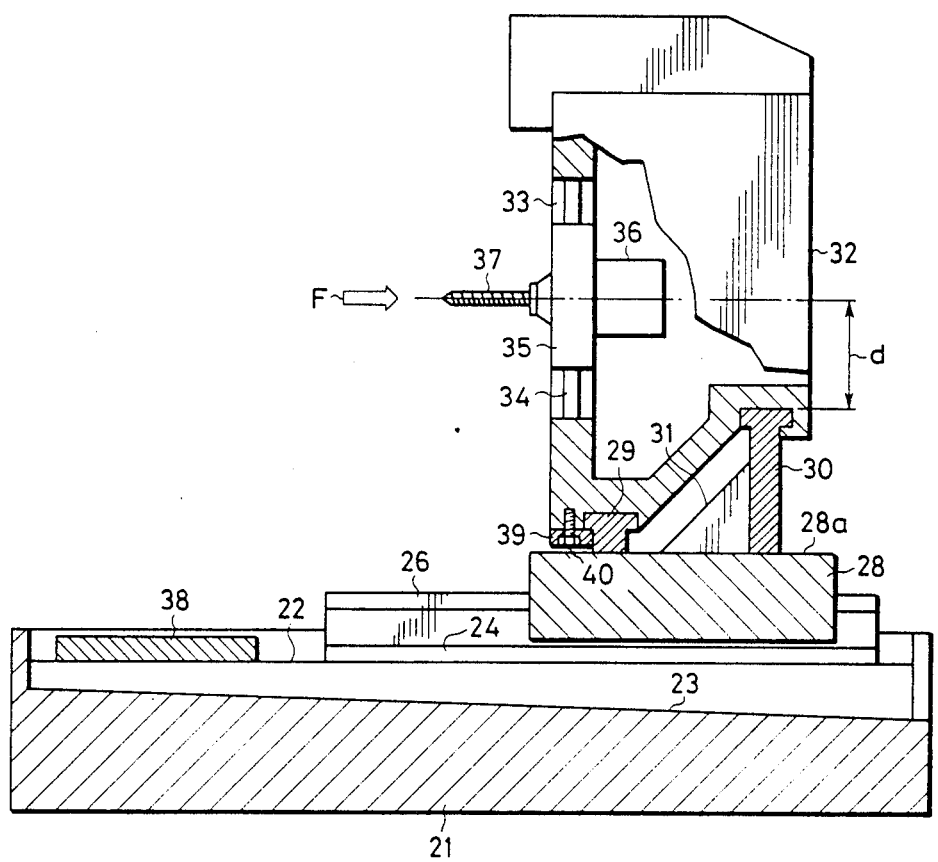
FIG. 4 is a side view of the apparatus of FIG. 3, partially shown in a sectional view taken along a line IV—IV in FIG. 3.

In FIGS. 3 and 4, reference numeral 21 designates a supporting bed 21, in the top portion of which a recess 22 is formed. A discharge passage 23 is formed centrally of and extends transversely of the recess 22. A first pair of guide rails 26 and 27 is mounted on the bed 21, extending in the transverse direction. The guide rails 26 and 27 are mounted on the supporting bed 21 through plates 24 and 25, respectively, fitted in the recess 22.

A table 28 is slidably supported by the first pair of guide rails 26 and 27. The table 28 may, for instance, be mounted on the guide rails 26 and 27 via linear slide bearings or the like. The table is movable in the transverse direction by a drive mechanism (not shown).

Figure 6:
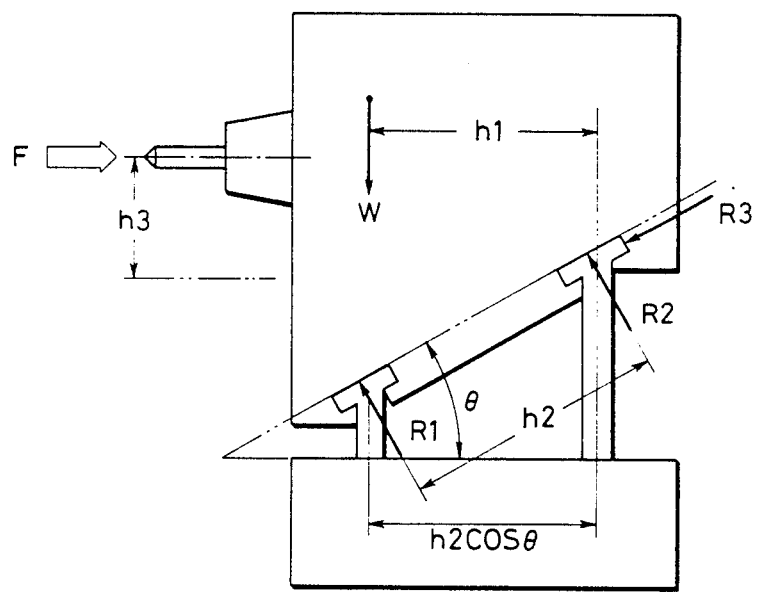
FIG. 6 is a schematic side view illustrating another embodiment of the present invention.
Figure 7:
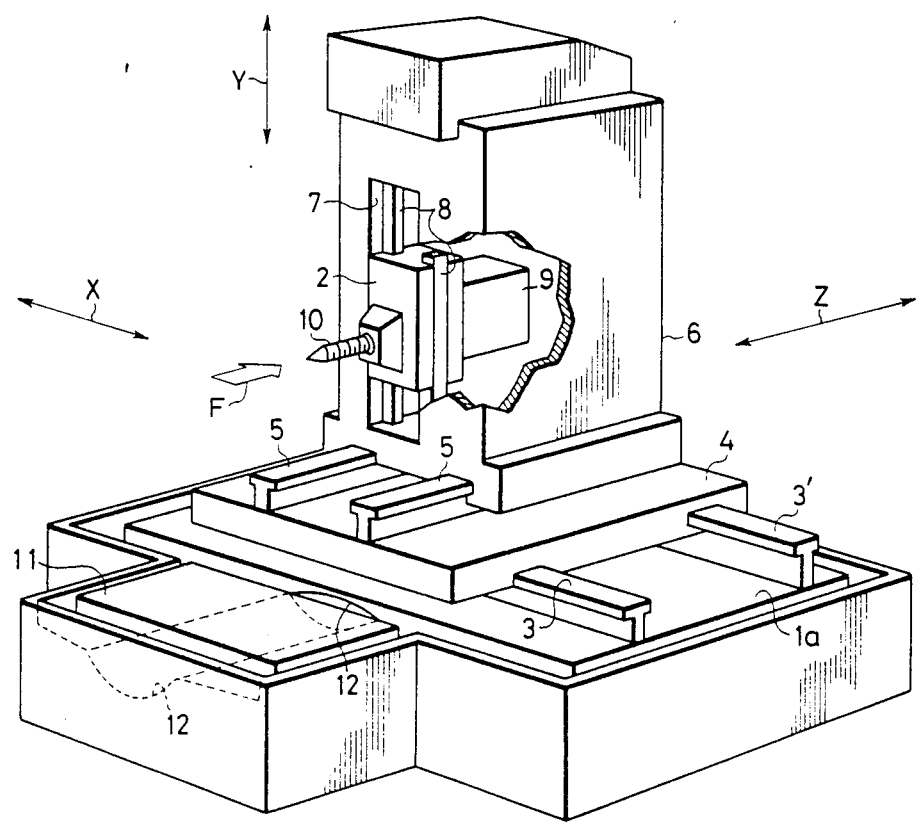
FIG. 7 is a schematic perspective view, with parts cut away, of the present invention.

A second pair of guide rails 29 and 30 are disposed parallel to one another on the upper surface 28a of the table 28, extending in the longitudinal direction. The guide rail 30 at the rear of the table 28 is made higher than the guide rail 29 at the front of the table 28. Although, in the embodiment illustrated in FIGS. 3 and 4, the upper surfaces of the guide rails 29 and 30 lie in a horizontal plane, it is possible, as illustrated in the schematic view of FIG. 6, to incline them at an angle $\theta$. This arrangement will be discussed in more detail below.

In FIGS. 3 and 4, reference numeral 31 identifies a triangular reinforcing rib secured to the top of the table 28 and the rear guide rail 30.

A column member 32 is slidably supported on the table 28 through the guide rails 29 and 30. The column member 32 is movable in the longitudinal direction by a drive mechanism (not shown). As in the case of the table 28, the column member 32 may be mounted on the guide rails 29 and 30 via linear slide bearings or the like. Also similar to the conventional apparatus, a spindle head 35 is slidably mounted by a pair of guide rails 33 and 34 in a window formed in the front surface of the column member 32. A drive motor 36 is provided to turn the tool 37. The spindle head can be moved in the vertical direction by a third drive mechanism (not shown).

A jig bench 38 extending across the discharge passage 23 is mounted on the forward side of the supporting base 21 in the recess 22. A workpiece to be machined by the tool 37 is secured by a jig (not shown) to the jig bench 38.

A keeper plate 39 is secured to the column member 32, attached by bolts 40, to prevent the column member from coming off the guide rails 29 and 30 and being clockwise inverted.

The operation of the embodiment of the invention described with reference to FIGS. 2 and 4 of the drawings will now be explained.

Once the workpiece has been secured by the jig to the jig bench 38, the table 28, column member 32, and spindle head 35 are moved with their respective drive mechanisms to bring the tool 37 to the desired relative position with respect to the workpiece. The motor 36 is then operated to rotate the tool 37. Then, the table 28 is advanced towards the workpiece to effect a machining operation. Metal chips produced during the machining operation are swept away by a coolant or the like circulated through the discharge passage 23.

During the machining operation, the reaction force F acting on the tool 37 produces a moment M acting to turn the column member 32 relative to the rails 29 and 30. However, for the reasons discussed above, by making the height of the rear guide rail 30 greater than that of the front guide rail 29, the magnitude of this turning moment is reduced relative to that produced in the conventional apparatus. Although a great lifting force is caused by the turning moment to act on the front guide rail 29 on the front side, this lifting force is reduced since the turning moment is reduced as above mentioned. Thus, a durability, which is acting on an engaging portion of the column member 32 and the front guide rail 29, will be reduced. Further, a great external force, i.e., the turning moment and the weights of the column member 32 and the spindle head 35, acts on the table 28. However, the durability of the table 28 is sufficient since the front and rear guide rails 29, 30 are different from each other in level. As a result, rigidity of the table 28 is improved to cope with such moment and weights. Such reduction in the turning moment may be afforded in the same manner as aforementioned if only the rear guide rail on the bed is provided at a higher level than the front guide rail even though the longitudinal guide rail is disposed on the bed and the transverse guide rail is arranged on the table according to the prior art. Thus, it is not necessary to strengthen the table 28 nor the column member 32, thereby resulting in the advantage that the weight of the apparatus is reduced.

Although in the embodiment described with reference to FIGS. 3 and 4 the longitudinally extending guide rails are mounted on the sliding table while the guide rails upon which the sliding table is mounted directly to the supporting bed extend in the transverse direction, the orientations of the two sets of guide rails can be reversed. That is, the pair of guide rails mounted directly on the supporting bed 21 can be made to extend in the longitudinal direction while the pair of guide rails mounted on be sliding table extend in the transverse direction. It is only necessary that the rear one of the guide rails which extend in the longitudinal direction be higher than the front one of that pair.

Figure 5:
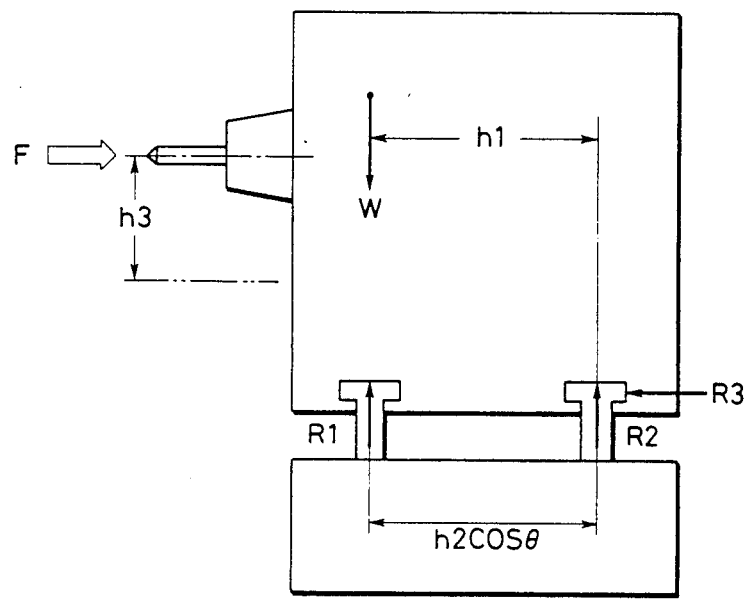
FIG. 5 is a side view illustrating the concept of conventional machine tools.

Reaction forces for three different cases were calculated: (1) the case of the conventional apparatus as illustrated in FIG. 5, (2) the present invention as illustrated in FIGS. 3 and 4 employing longitudinally extending guide rails of different heights with the upper surfaces of this pair of guide rails lying in the horizontal plane, and (3) the case illustrated in FIG. 6 wherein the rear of the pair of longitudinally extending guide rails is higher than the front rail of this pair and the upper surfaces of the longitudinally extending guide rails are slanted at an angle of 20°. For these calculations, a reaction force F of 2,000 kg and a dead weight W of 1,600 kg were assumed. Further, it was assumed that the horizontal distance $h_1$ between the center of gravity of the movable block member and the rear guide rail of the longitudinally extending pair was 550 mm, the distance $h_2$ between the centers of the longitudinally extending rails was 585 mm, and the distance $h_3$ between the center of the machine tool at its uppermost and lowermost positions was 500 mm. For these conditions, the reaction forces $R_1$ and $R_2$ acting perpendicularly to the upper surfaces of the respective front and rear ones of the longitudinally extending guide rails and the force $R_3$ acting perpendicularly to the forces $R_1$ and $R_2$ were calculated. The results of these calculations are shown in the following Table. In the Table, the reaction expressed in the positive figure is pressing force to slide surface and that expressed in negative figure is a lifting force. What is referred to as "uppermost end" is the manner in which the tool is moved upward along the vertical direction to the maximum, whereas what is referred to as "lowermost end" is the manner in which the tool is moved downward along the vertical direction to the maximum. As compared with the conventional type, it is understood from the table that the parallel and different level type and the slant type are adapted to reduce the reaction R1 on the fulcrum in either uppermost or lowermost end. In the conventional type, the slide surface is always inclined to be lifted up since the fulcrum reaction R1 is in the negative load in a major portion of the tool stroke. However, the keep plate and bolts are adapted to cope with such lifting force as shown in FIG. 4 thus resulting in an ill effect on machining tolerances. It is preferable that the period of the fulcrum reaction R1 of a positive value is longer when the tools are in the stroke. In the parallel and different level type and slant type, a lower portion of the stroke is a positive compressive force. It is apparent therefrom that the fulcrum reaction is improved since the lower portion of the stroke is mainly available in the actual machining.

TABLE

| Position of Head | Reaction Force | Conventional Type | Parallel and Different Level Type | Slant type |
|---|---|---|---|---|
| Uppermost | $R_1$ | −1674 | −945 | −888 |
|  | $R_2$ | 3273 | 2545 | 3076 |
|  | $R_3$ | 2000 | 2000 | 1332 |
| Lowermost | $R_1$ | 146 | 873 | 821 |
|  | $R_2$ | 1454 | 727 | 1367 |
|  | $R_3$ | 2000 | 2000 | 1332 |
|  |  |  |  | Weight Kg |

The data of the Table above makes it clear that the use of the invention results in a marked reduction of the reaction forces acting on the longitudinally extending guide rails comparing with that of the conventional type.

This completes the description of the preferred embodiments of the invention. Although preferred embodiments have been described, it is believed that numerous modification and alterations thereto would be apparent one having ordinary skill in the art without departing from the spirit and scope of the invention.

I claim:

1. A machine tool comprising:
   a supporting bed (21);
   a first pair of guide rails (26, 27) mounted on said supporting bed and extending in a first (Z) direction relative to a workpiece to be machined by said machine tool;
   a table (28) slidably supported by said first pair of guide rails for moving in said first direction;
   a second pair of guide rails (20, 30) mounted on said table and extending in a second (X) direction;
   a column member (32) slidably supported by said second pair of guide rails for moving in said second direction;
   a spindle head (35) slidably supported by said column member for moving in a third (Y) direction;
   a tool (37) removably mounted on said spindle head for machining said workpiece during relative movement in said first direction between said tool and said workpiece; and
   a rear one (30) of said second pair of guide rails relative to said workpiece having a height substantially greater than the other (29) of said second pair of guide rails, whereby a first distance substantially along said third direction between said tool and said rear one of said guide rails is less than a second distance substantially along said third direction between said tool and said other of said guide rails.

2. The machine tool of claim 1, wherein each of said second pair of guide rails has an upper surface located in a horizontal plane.

3. The machine tool of claim 1, further comprising at least one reinforcing rib (31) secured to the top of said table (28) and said rear guide rail (30).

4. The machine tool of claim 1, further comprising a discharge passage (23) disposed between said first pair of guide rails and extending in said first (Z) direction.

5. The machine tool of claim 4, wherein said discharge passage is a groove formed in said supporting bed, and said groove is inclined, an end portion of said groove at a front side of said machine tool is located higher than another end portion of said groove at a rear side of said machine tool.

6. The machine tool of claim 1, wherein each of said second pair of guide rails has an upper surface located in a common plane forming an oblique angle with respect to an upper surface of said supporting bed.

* * * * *